(12) United States Patent
Bornhorst

(10) Patent No.: US 8,206,012 B2
(45) Date of Patent: Jun. 26, 2012

(54) LAYERED DIMMER SYSTEM

(75) Inventor: James Bornhorst, De Soto, TX (US)

(73) Assignee: Production Resource Group, LLC, New Windsor, NY (US)

( * ) Notice: Subject to any disclaimer, the term of this patent is extended or adjusted under 35 U.S.C. 154(b) by 453 days.

(21) Appl. No.: 12/493,330

(22) Filed: Jun. 29, 2009

(65) Prior Publication Data

US 2009/0323345 A1 Dec. 31, 2009

Related U.S. Application Data

(60) Provisional application No. 61/076,729, filed on Jun. 30, 2008.

(51) Int. Cl.
*F21V 7/00* (2006.01)

(52) U.S. Cl. ........ 362/307; 359/599; 362/276; 362/277; 362/295; 362/327

(58) Field of Classification Search ............... 362/245, 362/276, 277, 280, 293, 295, 307, 308, 311.11; 359/599

See application file for complete search history.

(56) References Cited

U.S. PATENT DOCUMENTS 6,663,262 B2 * 12/2003 Boyd et al. ................. 362/307
7,817,361 B2 * 10/2010 Mimura et al. .............. 359/885

* cited by examiner

*Primary Examiner* — Stephen F Husar
(74) *Attorney, Agent, or Firm* — Law Office of Scott C. Harris, Inc.

(57) ABSTRACT

A layered dimmer formed of different layers. The front layer may be a scattering layer, and the back layer may be a reflective layer. The light beam is scattered prior to reflecting, to avoid reflection back to form hotspots.

38 Claims, 5 Drawing Sheets

Minimum Feature Size

Semi-Stochastic Intensity Pattern 705
700

LAYERED DIMMER SYSTEM

This application claims priority to provisional No. 61/076,729, filed Jun. 30, 2008, the entire contents of which are herewith incorporated by reference.

BACKGROUND

Dimmer wheels often operate using halftone dots. More dots in an area causes more dimming effect.

The inventor recognizes a problem with these dots is that the dots themselves can sometimes be seen in the eventual projected light beam that is projected. This seeing of the dots can be undesirable.

These dimmers can also cause heat problems since the dimmer element can dissipate the heat.

Some parts of the light may reflect back at the lamp source, causing heat problems in the lamp, also.

Other ways of dimming are known. For example, the bulb be dimmed by reducing the power applied to the bulb. However, the color temperature of the lamp is changed as the lamp driving is changed.

Finger based dimmers can be used where the fingers extend into the beam.

SUMMARY

The present application describes a dimmer with special parts that allows improved dimmer operation.

A first operation minimizes the dimmer effect that can be seen in the projected beam.

Another embodiment minimizes and/or eliminates heat effects on the dimmer by the projected beam.

DETAILED DESCRIPTION

Figure 1:
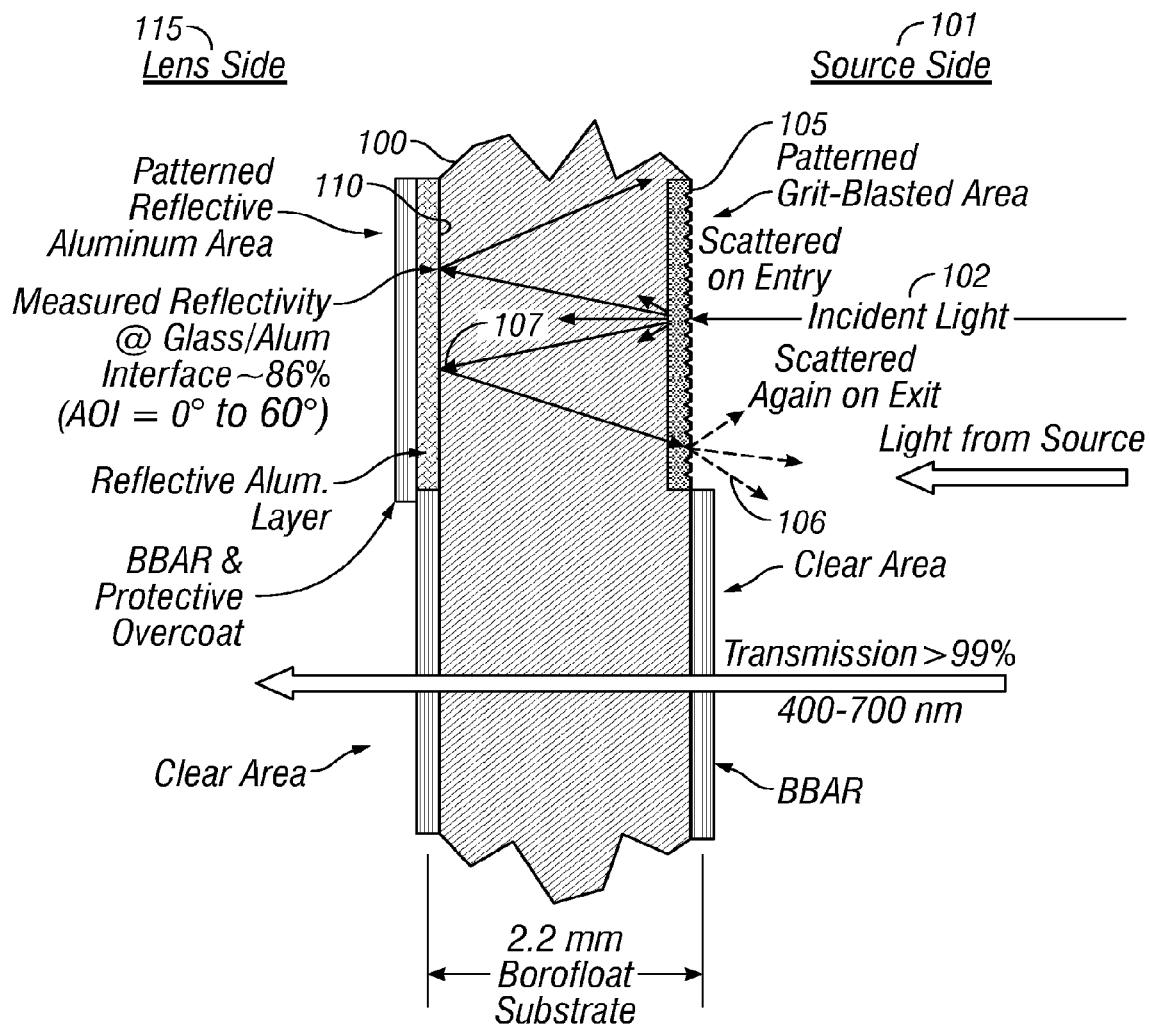
FIG. 1 shows a first embodiment of a dimmer wheel
FIG. 2 a plot of dimmer plane illuminance.

FIG. 1 shows a first embodiment of a dimmer according to an embodiment. The dimmer includes a glass substrate 100 which includes a source side 101, which receives the incident light 102, and a lens side 115. One or many portions 105 of the source side may be roughened, e.g, formed of frosted glass that forms a roughened surface. Other roughening layers can be used.

The light is scattered on entry by the roughened surface, forming scattering rays 107. A reflector layer 110 is placed on the other side, the "lens side" 115, of the glass substrate 100. The reflector 110 reflects back some of the light that has been diffused by the diffusion parts 105. Therefore, the rays 107 shown in FIG. 1 have already been scattered once. Hence, the by reflector 110 reflection causes a secondary scattering of those once-scattered rays. This forms reflected scattered rays thereby spreading the heat from the beam and the positions of the rays.

FIG. 1 shows many of the scattering rays, including the primary scattering 106, and the secondary scattering 107.

The reflector 110 can be a reflective aluminum layer. The glass-to aluminum interface can have a measured reflectivity of around 86%.

The dimmer substrate can be a 2.2 mm borofloat substrate. Both sides may be anti-reflectivity coated, e.g., with BBAR and protective coatings. With these materials, clear transmission, that is through un-coated parts, can be greater than 99%.

Figure 2:
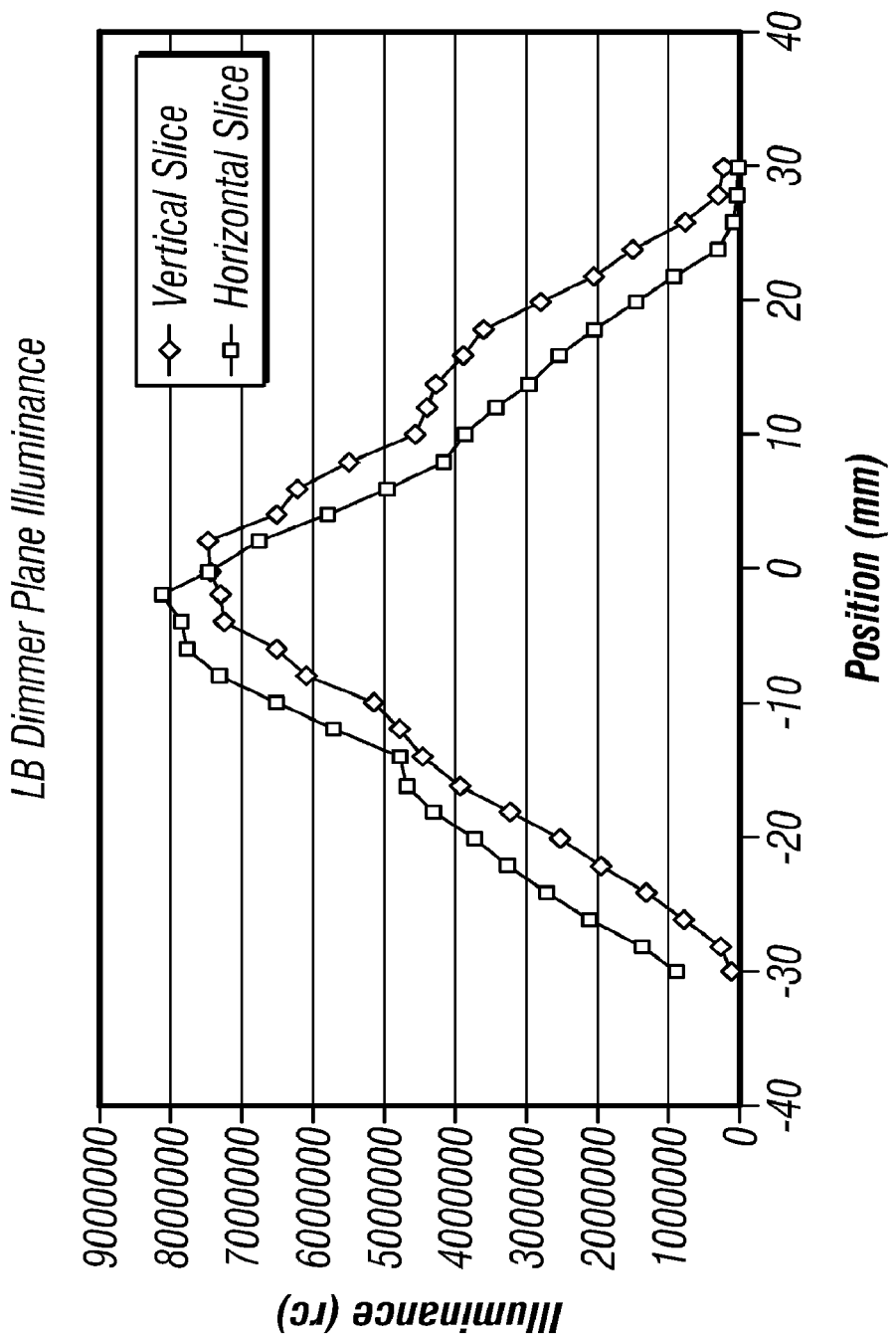

As described herein, both the reflective layer on the lens side, and the frosting layer 105 can also be patterned. Both can be patterned, for example, in the pattern of a rounded-end part with extending fingers as shown in FIG. 2. This pattern includes a round part 200 which completely scatters the round light beam, and a fingered part 205 that can be put into the beam according to a need for partial scattering of light.

The scattering is based on the recognition that the distribution of the light is maximum at one location. See the FIG. 2 which shows the "LB dimmer plane illuminance", showing that the beam intensity is maximum at the center of the beam and falls off rapidly from that location. Noting that the light is not constant across the entire beam, the patterns may be set to dim according to the light beam characteristics.

Figure 3:
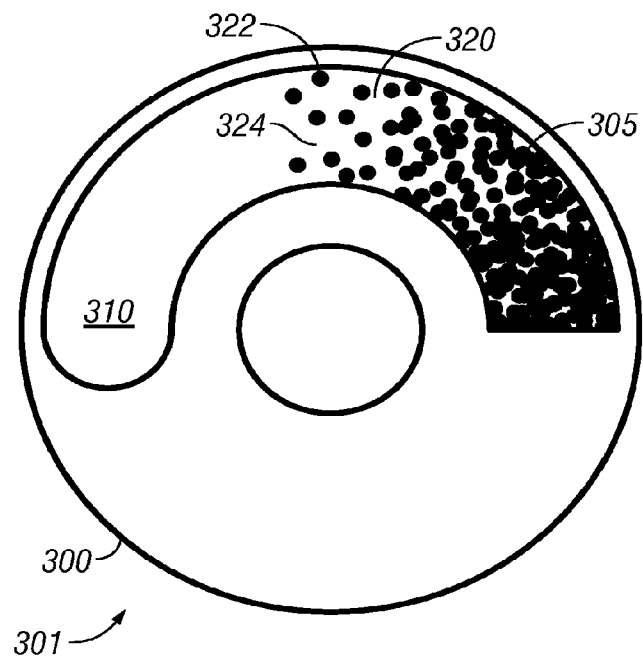
FIG. 3 illustrates a dimmer wheel.

In view of this, a dimmer wheel according to an embodiment is shown in FIG. 3. The dimmer wheel includes an open portion 310, and also includes a number of concentric finger areas 320. Each finger area such as 322 in general has a different darkness than another finger area 324 next to it and a different rate of change in the radial direction around the wheel. Some of the fingers are more generally more light-blocking, faster than others. This is done to control attenuation of light at locations through the dimmer area. In this embodiment, the "mask" has the etched finger areas 320, etched patterned portions 305, a totally open area 310, and a totally opaque area 301.

Figure 4:
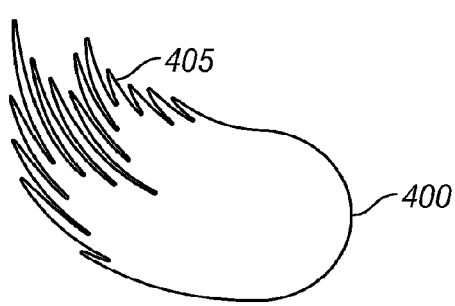
FIG. 4 shows a frost mask.

The frosting/scattering of the scattering portions 105 may also be carried out according to a mask as shown in FIG. 4. The frost mask is shown as having a completely opaque part 400, and fingers 405. Mild dimming can be carried out just using the frosting, e.g., the area 400. Even milder dimming can be carried out using the fingers 405. The lightest part of the dimming may be carried out using only the frosting. However the reflector can carry out even more dimming.

Figure 5:
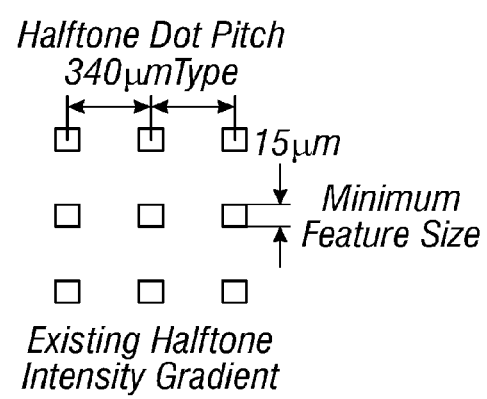
FIG. 5 shows a gradient for a reflection mask.

The reflector 110 may be patterned into a pattern that effects the dimming. For example, this may use a halftone intensity gradient dimming pattern as shown in FIG. 5. The dots may be square dots, of 15 um square minimum, but they may get larger in order to create more dimming effect. The dots are of 340 um typical center-to-center pitch.

The inventor recognizes that the frosting fingers may overlap with dots in that area. However, in one embodiment, the dots are prevented from being imaged by the frosting. The frosting stops or reduces back reflection, allows an initial and very mild dimming in that first area, and keeps the intensity gradient dots from being imaged.

Figure 6:
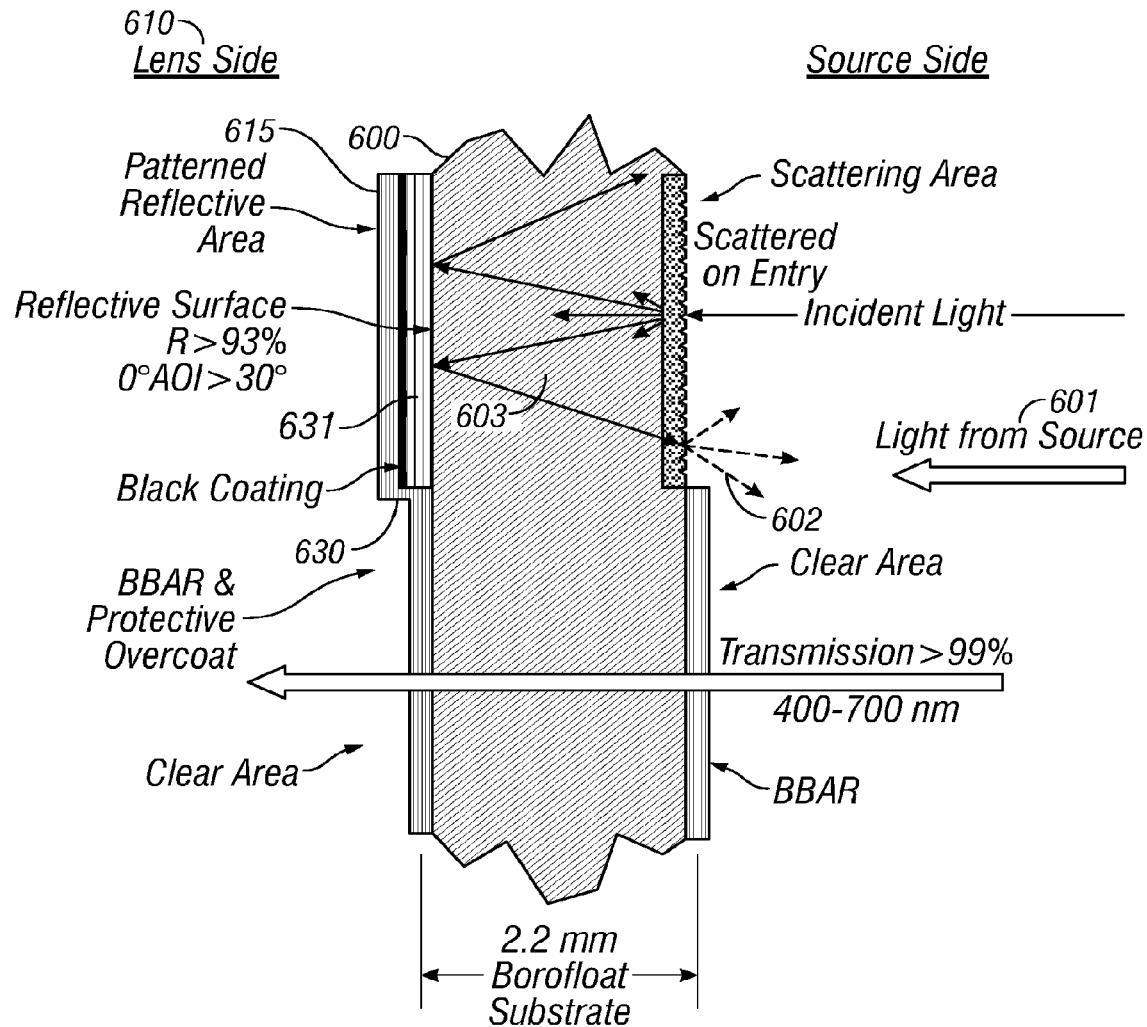
FIG. 6 shows a second embodiment of the dimmer wheel.

FIG. 6 shows another dimmer wheel embodiment 600, which has a reflective area 610 at the lens side 615. Light 601 from the source is scattered on entry at 602, and also reflected at 603.

In the FIG. 6 embodiment, the embodiment recognizes that a black coating may help the lens to "see" black. This may also absorb some of the light. The FIG. 6 embodiment uses an aluminum reflector 631 and a black layer 630 under the aluminum layer 631. In one embodiment, the black layer can be a dark mirror layer 630, which may further minimize the amount of reflection. The black layer may be patterned or continuous.

Figure 7:
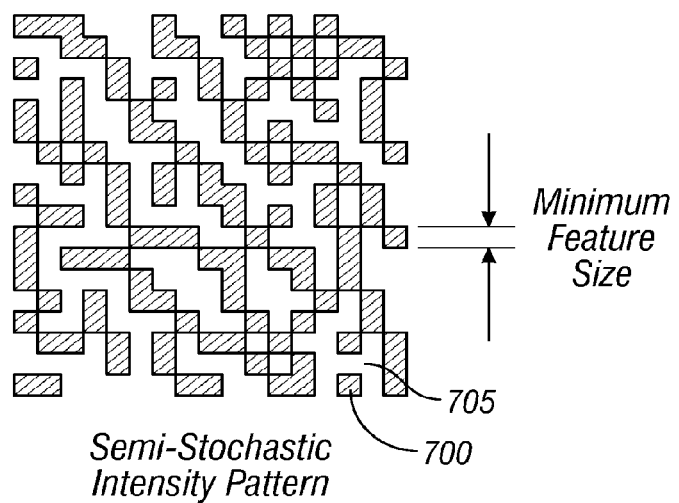
FIG. 7 shows an alternative pattern for a dimmer.

FIG. 7 shows an alternative embodiment for the reflector dimming pattern, which instead of halftone dots, uses a semi stochastic intensity pattern which has wholly reflecting "dots" 700, e.g., square areas. It also has open "dots" 705. The probability is set for any area based on the relationship between open and reflecting, e.g, for any dot, the probability of that dot being clear is 70%.

A random function can be used to form the pattern across an area, setting only the probability and the minimum feature size. The probability is sent by the desired amount of dimming.

Since this pattern is semi-random, even if it can be seen in the eventual light beam, it will be much less noticeable.

Figure 8:
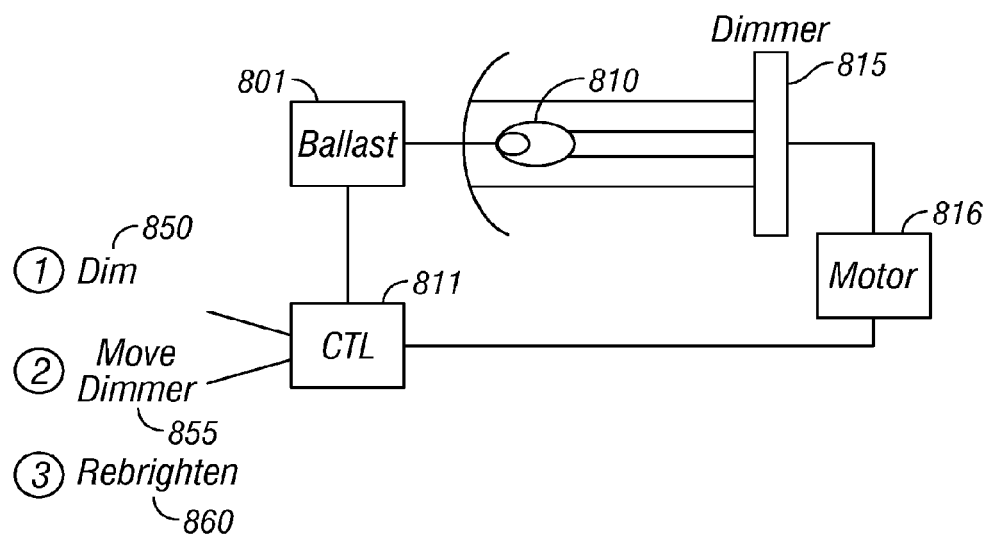
FIG. 8 shows a light system with a dimmer.

The dimmer is used in one embodiment in an automated stage light, e.g., a light that produces a beam of light using a bulb greater than 700 watts, and perhaps more than 1400 watts or more. A software control can also be carried out on the light to avoid burning the dimmer. The embodiment shown in FIG. 8 which shows a block diagram of the hardware including operations that are carried out by the controller 811, which may be a processor that operates according to stored instructions.

A ballast 801 or other lamp controller that controls the intensity of the lamp 810. The lamp output 815 is coupled to the dimmer.

In order to dim, a controller 811 controls the effect temporarily.

The dimming wheel is also moved rotated by a motor 816, which can move the dimmer to different locations. For example, motor 816 can move the dimmer in and out of the light beam, and/or can rotate the dimmer to different locations where there are different amounts of dimming caused by different patterns. While the dimmer wheel is shown as a rotating wheel, it can also move laterally to put different parts of the substrate into the light beam. In addition, the substrate can be rectangular, and can be moved within the light beam to place different portions of the substrate into the light beam.

At 850, when a command is received to dim an effect, first one dims the lamp, for example the 1400 W lamp is dimmed to 700 W. This can be done by controlling the electronic ballast 801. Then, at 855, the dimmer 815 is moved into its place, e.g., the wheel with the dimmer on it is rotated to put the dimmer portions within the light beam. One the dimmer is in place, the light can be kept as is, or can be re-brightened at 860. This prevents the wheel from overheating, minimizes thermal shock, but still produces a large amount of output. This combines software and hardware control to produce certain advantages.

In the embodiments, each optical item may have antireflective coatings on both sides of the substrate. This may be only located in certain locations, e.g., only in the areas for transmission. Usually there is 4 to 5% reflection per surface, but this can be reduced to a ½ percent with coatings.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

For example, while the above describes specific materials including quartz and glass, it should be understood that other materials, and more particularly other glasses, can be used as substrates. Other patterns can be used on the dimmers. Even though an exemplary embodiment describes the dimmers being on "wheels", it should be understood that the dimmers can be on other substrates, such as movable plates.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the embodiments disclosed herein, may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system, comprising:
    a substrate, having first and second oppositely facing surfaces;
    a roughening layer, located on the first surface, where the first surface is intended to receive incident light; and
    a patterned reflecting layer, having a first pattern which is different at different areas of the substrate, said patterned reflecting layer located on the second surface, said pattern reflecting layer having a pattern which causes different amounts of reflection on different areas of the surface.

2. A system as in claim 1, wherein said roughening layer is of a type which causes diffusion of incoming light to cause scattering rays from the otherwise parallel rays.

3. A system as in claim 2, wherein said roughening layer is formed by frosted glass on said first surface.

4. A system as in claim 2, wherein said roughening layer is formed in a pattern where different areas on the substrate have different amounts of roughening.

5. A system as in claim 4, wherein said pattern of said roughening layer includes an area with complete roughening, and an area which has roughening in a pattern with some areas having roughening, and other areas not having roughening.

6. A system as in claim 1, wherein said substrate is disk shaped, and said patterned reflecting layer has different amounts of patterning at different concentric areas on the disc.

7. A system as in claim 1, wherein said patterned reflecting layer has a halftone pitch which varies at different areas.

8. A system as in claim 1, wherein said patterned reflecting layer has a semi-stochastic intensity patterns.

9. A system as in claim 6, wherein said patterned reflecting layer has a number of different dimming areas on the wheel, said dimming areas extending concentrically around the wheel.

10. A system as in claim 9, wherein said fingers have different rates of change in the radial direction around the wheel.

11. A system as in claim 1, wherein said patterned reflecting layer is an aluminum layer which is patterned.

12. A system as in claim 11, wherein said patterned reflecting layer also includes a black coating over the aluminum layer.

13. A system as in claim 1, wherein further comprising a black layer, over said reflecting layer, and covering said reflecting layer on said second surface.

14. A system as in claim 13, wherein said black layer is formed of a dark mirror.

15. A system as in claim 1, further comprising at least one anti-reflective coating over the substrate.

16. A lighting system, comprising:
    a lighting element;
    a dimming element, said dimming element having a substrate, having first and second oppositely facing surfaces, a roughening layer, located on the first surface, where the first surface is positioned to receive incident light from said lighting element, and a patterned reflecting layer, having a first pattern which is different at different areas of the substrate, said patterned reflecting layer located on the second surface, said patterned reflecting layer having a pattern which causes different amounts of reflection on different areas of the surface;
    a moving element for said dimming element, which moves said dimming element so that different areas of said substrate are placed within the light beam; and
    a controller, which controls said lighting element, and said moving element, to place different areas of said dimming element in said incident light.

17. A system as in claim 16, wherein said roughening layer is of a type which causes diffusion of incoming light to cause scattering rays from the otherwise parallel rays.

18. A system as in claim 16, wherein said roughening layer is formed by frosted glass on said first surface.

19. A system as in claim 17, wherein said roughening layer is formed in a pattern where different areas on the substrate have different amounts of roughening.

20. A system as in claim 16, wherein said substrate is disk shaped, and said patterned reflecting layer has different amounts of patterning at different concentric areas on the disc, and said moving element comprises a part that rotates said disk.

21. A system as in claim 16, wherein said patterned reflecting layer has a halftone pitch which varies at different areas.

22. A system as in claim 16, wherein said patterned reflecting layer has a semi-stochastic intensity pattern.

23. A system as in claim 20, wherein said patterned reflecting layer has a number of different dimming areas on the wheel, said dimming areas extending concentrically around the wheel.

24. A system as in claim 23, wherein said fingers have different rates of change in the radial direction around the wheel.

25. A system as in claim 16, wherein said patterned reflecting layer is an aluminum layer which is patterned.

26. A system as in claim 25, wherein said patterned reflecting layer also includes a black coating over the aluminum layer.

27. A system as in claim 16, wherein further comprising a black layer, over said reflecting layer, and covering said reflecting layer on said second surface.

28. A system as in claim 27, wherein said black layer is formed of a dark mirror.

29. A method, comprising:
forming a beam of light along an axis;
first, scattering said beam of light using a scattering layer that is on the first side of a dimming substrate;
second, reflecting said scattered light using a patterned reflecting layer, which is patterned according to an amount of desired dimming; said reflecting using a reflecting layer that is on a second side of the substrate; and
passing a dimmed beam which has been dimmed by both said scattering and said reflecting.

30. A method, of dimming a beam of light, comprising:
forming a beam of light along a path;
at a first time, forming said beam of light at a first intensity;
sensing a request to dim said beam of light;
responsive to said request, first electronically reducing an intensity of the beam of light, second moving the dimmer into the path of said beam of light, and third increasing the intensity of the beam of light which is in the path.

31. A method, comprising:
forming a beam of light along an axis;
detecting a first dimming command, and responsive to said first dimming command, scattering said beam of light using a scattering layer that is on the first side of a dimming substrate;
detecting a second dimming command, and responsive to said second dimming command, reflecting said scattered light using a patterned reflecting layer, which is patterned according to an amount of desired dimming, where said reflecting using a reflecting layer that is on a second side of the substrate; and
detecting a third dimming command, and responsive to said third dimming command, doing both of scattering said beam of light using the scattering layer that is on the first side of a dimming substrate and also reflecting said scattered light using the patterned reflecting layer which is patterned according to an amount of desired dimming, where said reflecting using a reflecting layer that is on a second side of the substrate passing a dimmed beam which has been dimmed by both said scattering and said reflecting.

32. A system, comprising:
a substrate, having first and second oppositely facing surfaces;
a dimming layer, located on at least one of said surfaces, where said dimming layer has a semi-stochastic intensity pattern, which has light passing and light blocking areas forming a pattern, and a probability of an area being light blocking sets an amount of dimming, and is different at a first area than it is at a second area on the dimming layer.

33. A system as in claim 32, wherein said dimming layer is a light scattering layer which is located on the first surface.

34. A system as in claim 32, wherein said dimming layer is a patterned reflecting layer, having a first pattern which is different at different areas of the substrate, said patterned reflecting layer located on the second surface, said pattern reflecting layer having a pattern which causes different amounts of reflection on different areas of the surface.

35. A system as in claim 33, wherein said dimming layer is a patterned reflecting layer, having a first pattern which is different at different areas of the substrate, said patterned reflecting layer located on the second surface, said pattern reflecting layer having a pattern which causes different amounts of reflection on different areas of the surface.

36. A method comprising:
controlling a dimmer device to move to a first location where dimming is carried out using a pattern of reflectors on a first surface; and
second, controlling said dimmer device to move to a second location where dimming is carried out using frosting of an otherwise clear surface on said dimmer device.

37. A method as in claim 36, further comprising moving said dimmer device to a third location where dimming is carried out using both said frosted surface and also said pattern of reflectors.

38. A method as in claim 37, wherein said pattern of reflectors is prevented from being imaged by said frosted surface in said third location.

* * * * *